United States Patent Office 3,711,245
Patented Jan. 16, 1973

3,711,245
LIQUID FOR PAD-BATH DYEING CONTAINING GLYCOL COMPOUND AND BORIC ACID OR BORAX
John F. Neumer, Hockessin, Del., assignor to E. I. du Pont de Nemours and Company, Wilmington, Del.
No Drawing. Filed Sept. 18, 1970, Ser. No. 73,664
Int. Cl. C09b 67/00; D06p 3/82, 5/04
U.S. Cl. 8—21 R          3 Claims

ABSTRACT OF THE DISCLOSURE

An improved process for dyeing water swellable cellulosic fibers, alone or blended with synthetic fibers, by contacting the fibers throughout with an aqueous solvent or a solvent solution of a preformed dispersed dye, said solvent consisting of ethylene glycol or a derivative thereof, the improvement comprising increasing the fixation of dye on the cellulosic fibers by adding an effective amount of boric acid, borax or a mixture thereof.

BACKGROUND OF THE INVENTION

(1) Field of the invention

This invention is directed to a process for dyeing water swellable cellulosic materials, especially cellulosic fibers, either alone or in blends or mixtures with synthetic materials, especially synthetic fibers, with preformed dyes.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose may be exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye cellulose by directly introducing into the material a preformed, nonreactive, water insoluble dye since such dyes have little natural affinity for or substantivity to cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The use of water insoluble dyes for dyeing cellulose acetate is disclosed in U.S. Pat. 2,923,593. However, such substrates are considered in the art as nonswellable in the presence of water and the dyeing thereof is recognized as being unlike the dyeing of water swellable cellulosic materials.

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of lower water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyeing processes for blends or mixtures of cellulosic and synthetic materials. Generally, complex two-stage processes are required and the components of the blend or mixture are dyed in separate steps with different dyes. The amounts of dyes required usually are high, with each component undesirably interfering with the dyeing of the other. The complexity of the two-stage process also is apparent from a consideration of the divergency of operating conditions between conventional dyeing processes for cellulosic and synthetic materials. In contrast to the aforesaid procedures for dyeing cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. 3,313,590. Analogous to the dyeing of such blends and confirming the aforesaid distinction between swellable cellulosic materials and nonswellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but other reactive materials which are insouble in water but soluble in said high boiling, water soluble, nonreactive compound. A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. 832,343 disclosed a process for dyeing water swellable cellulosic materials with preformed disperse dyes, that is, dyes which do not require an in situ chemical reaction, such as oxidation or reduction, for development of color on the substrate, such as a fabric, which process comprises contacting a water swellable cellulosic material in any sequence with the following:

(1) Water in an amount sufficient to swell the cellulose;

(2) A preformed dye in an amount sufficient to color the cellulose, a boiling saturated solution of which dye in 0.1 molar aqueous sodium carbonate exhibits an optical absorbance not in excess of about 30; and (3) A solvent in an amount sufficient to maintain swelling of the cellulose if water is removed, and which (a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula $$R\left(O-CH-CH_2 \atop C_nH_{2n+1}\right)_m R^1 \text{ or } \left[R\left(O-CH-CH_2 \atop C_nH_{2n+1}\right)_m O\right]_x A$$

wherein
$n$ is 0 or 1;
$m$ is a positive whole number;
R is H, $C_{1-8}$ alkyl, $C_{7-15}$ aralkyl or alkaryl, $$R^2C-, R^2SO_2-, \text{ or } R^2OC-, \atop \parallel \atop O$$

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl; $R^1$ is —OH, —$OR^2$, —$SR^2$, —$NHR^2$, —$NR^2$ ($C_{1-8}$ alkyl), —$NR^2$ ($C_{7-15}$ aralkyl or alkaryl), $$-OCR^2, -OSO_2R^2, -OCOR^2 \atop \parallel \phantom{xxxx} \parallel \phantom{xx} \parallel \atop O \phantom{xxxxxxxx} O$$

—NH(phenyl), or —NH(naphthyl), wherein $R^2$ is as defined above;
$x$ is the number of unsatisfied valencies in A; and
A is $ROCH_2CHORCH_2—$, —$CH_2CHORCH_2—$,

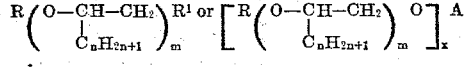

—$CH_2C(CH_2OR)_3$, (—$CH_2)_2C(CH_2OR)_2$,

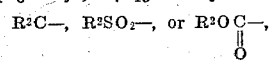
(—$CH_2)_3CCH_2OR$,

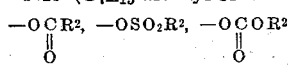
(—$CH_2)_4C$, —$CH_2(CHOR)_yCH_2OR$

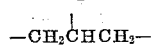
—$CH_2(CHOR)_yCH_2—$ or —$CH_2(CHOR)_{y-z}(—CH)_zCH_2—$ in which $y$ is 2, 3 or 4; $z$ is 0, 1, 2, 3 or 4 but no greater than $y$; and R is as defined above;

provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

Conventional vat and disperse dyes can be used in the Blackwell et al. process, but most such dyes are unsatisfactory in commercial operations. The vat dyes usually provide only surface staining because they lack sufficient solubility in the Blackwell et al. solvents and do not penetrate the fiber. Such surface stains can be largely removed by aqueous detergent or drycleaning scour. The conventional disperse dyes, on the other hand, although they may penetrate the fiber, are sufficiently soluble in hot alkali to be removed during aqueous detergent scour.

When a water-insoluble dye is applied by padding to a cellulosic fabric by the action of heat in the absence of a dye solvent, penetration of the fibers by the dye is essentially zero. As a solvent of the type disclosed by Blackwell et al. is added to the pad-bath in increasing amounts, the penetration and hence the fixation of the dye within the cellulose also increases, until a maximum level is reached which is not exceeded by the addition of more solvent. Whether or not this maximum level of fixation is essentially quantitative depends on (a) the amount of dye in the pad-bath, (b) the solubility of the dye in the solvent, and (c) the solvent/cellulose ratio. If a deep shade is desired, enough dye must be carried into the cellulosic fibers by the solvent to produce the desired shade. Thus, the dye must be highly soluble in the solvent at the dyeing temperature.

When a water-insoluble dye is applied by padding to a cellulosic blend fabric, such as a polyester-cotton blend, by the action of heat in the absence of a dye solvent, only the synthetic component of the blend is dyed. Any dye adhering to the cellulosic fibers is removed by scour. As a solvent of the type disclosed by Blackwell et al. is introduced into the dyebath in increasing amounts, the fixation of dye on the cellulosic portion of the blend rises accordingly, producing deeper shades on the cellulose and hence on the blend fabric. At a certain point, enough solvent will be present to cause essentially quantitative fixation of the dye on the fabric. At this point, the distribution of the dye between the blend components will depend on the dye, the solvent and the composition and weight of the fabric itself. If the amount of solvent in the dyebath is increased still further, the total fixation of dye remains about the same, but the distribution of dye shifts in favor of the cellulosic portion.

Ideally, the components of a blend fabric are dyed to equal strength, in order to obtain (a) the maximum levelness of dyeing and (b) the minimum degree of frosting of the fabric with wear. Frosting is a well known phenomenon which manifests itself as discolored areas caused by the uneven rate of wear of the components of a blend fabric if the components differ significantly in the shade and strength at which they are dyed. In some instances, however, it is found that the strongest dyeings are obtained on a blend fabric when the cellulosic portion is dyed more strongly than the synthetic portion. Such a condition is satisfactory as long as the difference in strength between the blend components is not sufficiently great to render the levelness of dyeing and the frosting characteristics of the fabric unacceptable.

In the aforementioned process of Blackwell et al., it is desirable to use the minimum amount of solvent necessary to achieve a satisfactory dyeing on cellulose or a cellulosic blend fabric, thus reducing (a) the initial cost of the solvent and (b) the problem of recovering the solvent after dyeing is complete. Furthermore, in pad-baths containing an aqueous dye dispersion and a solvent, excessive amounts of solvent may adversely affect the stability of the dye dispersion. Any means for increasing the capacity of a solvent to improve the fixation of a dye on cellulosic fibers, or to shift the distribution of a disperse dye in favor of the cellulosic portion of a blend fabric in the aforesaid process will decrease the amount of solvent required and will therefore be advantageous.

OBJECTS AND SUMMARY OF THE INVENTION

It is an object of the present invention to provide a process for dyeing water swellable cellulosic materials, continuously if desired, with a broad spectrum of preformed dyes of limited water solubility, said process providing high utilization of the dye. Another object is to provide a process for dyeing water swellable cellulosic materials in admixture or blended with synthetic materials. Still another object is to provide a process for union dyeing both the cellulosic and synthetic components of a blend or mixture by means of a single dye. Another object is to provide a process for dyeing blends or mixtures of cotton and polyester or cotton and polyamide. A further object is to provide dyed cellulosic materials, and blends or mixtures thereof with synthetic materials, which are fast to aqueous washing and/or drycleaning with organic solvents. Another object is to provide a means for increasing the fixation of dye on water swellable cellulosic fibers, alone or blended with synthetic fibers. Still another object is to provide a means for reducing the amount of solvent required to achieve optimum dyeings by the aforesaid Blackwell et al. process.

In summary, the present invention resides in an improved process for dyeing water swellable cellulosic fibers, alone or blended with synthetic fibers, by contacting the fibers throughout with an aqueous solvent or a solvent solution of a preformed disperse dye, said solvent consisting of ethylene glycol or a derivative thereof, the improvement comprising increasing the fixation of dye on the cellulosic fibers by adding an effective amount of boric acid, borax or a mixture thereof.

DETAILED DESCRIPTION OF THE INVENTION

As already indicated, the invention resides in a means of increasing the fixation of a preformed dispersed dye on water swellable cellulosic fibers, alone or blended with synthetic fibers. The invention also includes liquid mixtures which are useful in the formulation of dyebaths and printing pastes which are employed to dye water swellable cellulosic fibers. Such liquid mixtures consist essentially of (a) 5–99.9% by weight of a first solvent selected from ethylene glycol and derivatives thereof,
(b) 0–25% by weight of a second solvent different from the first solvent and selected from ethylene glycol and derivatives thereof,
(c) 0–94.9% by weight of water, and
(d) 0.1–10% by weight of boric acid, borax or a mixture thereof.

Although the present invention is useful in any embodiment of the aforesaid Blackwell et al. process, it is especially useful in pad-bath embodiments, and particularly such embodiments involving the dyeing of blend fabrics having a water swellable cellulosic component and a synthetic component, for example, cotton-polyester blend fabrics.

It has been found that the incorporation of small amounts of boric acid, borax or a mixture of the two into the pad-bath often has the effect of producing stronger dyeings on the cellulosic component and weaker shades on the polyester component of such blend fabrics, the total dye fixation remaining about the same. The overall visual effect may be a net increase, no noticeable difference or a net decrease in shade strength on the blend fabric depending on the dye, the solvent, the quantities of solvent and boric acid in the pad-bath and the composition and weight of the fabric itself.

In the preferred solvent range of 50–300 grams per liter of dyebath, boric acid in an amount up to about 30 grams per liter of dyebath (or a molar equivalent of borax), often produces a net increase of shade strength on the blend fabric versus an identical dyeing in the absence of the boric acid without having an adverse effect on dye shade or fastness properties. Thus, the use of boric acid in the process of Blackwell et al. for dyeing cellulosic-synthetic blend fabrics provides a simple and economical means for adjusting the partition of a disperse dye between the cellulosic and synthetic components in favor of the cellulosic portion of the blend. As indicated above, the optimum amount of boric acid depends on the dye, the fabric and the solvent involved.

If the amount of boric acid in the dyebath is too high, the blends may undergo a progressive weakening of shade with a concomitant increase in unlevelness until a heather effect is obtained. Thus, the benefits of using boric acid as described above are experienced only at relatively low concentrations.

As is obvious from the above, there are at least two ways in which the present invention can be used to advantage in the aforesaid Blackwell et al. process. Boric acid, borax or a mixture thereof can be added to the dyestuff either to increase the strength of the dyeing or to produce an equally strong dyeing with less solvent. The optimum system depends on the nature of the dye, the solvent and the fabric.

The solvents which are useful herein are those disclosed by Blackwell et al. and defined hereinabove by formulas. Especially useful solvents are those having the formula

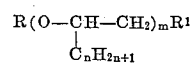

as previously defined. A particularly preferred class of solvents is given by the above formula wherein $n$ is 0 and $m$ is 2 to 25.

For example, when $n$ is 0, $m$ is greater than 1, R is H, and $R^1$ is —OH in the above formula, the solvents are polyethylene glycols which are available as articles of commerce in various molecular weights and molecular weight ranges. Triethylene glycol and polyethylene glycol of average molecular weight 600 are representative of such glycols.

Similarly, when $n$ is 0, $m$ is greater than 1, R is $C_{1-8}$ alkyl, and $R^1$ is —OH in the above formula, the solvents are alkyl ethers of polyethylene glycols and when R is H and $R^1$ is

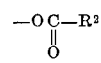

the solvents are esters of polyethylene glycols. The preferred solvent members of these classes are the methyl ethers and acetate esters, as well as diethers, diesters, and ether esters, such as methoxy diethylene glycol acetate.

Beta-phenoxyethanol is an example of a useful solvent of the above class in which $n$ is 0, $m$ is 1, R is H and $R^1$ is —$OR^2$ wherein $R^2$ is $C_6$ aryl.

Solvents of the above formula in which $n$ is 1 and $m$ is greater than 1 are polyproplene glycols or derivatives of polypropylene glycols. Because of the lower water solubilities of the polypropylene glycols and their derivatives, the preferred solvents of this class are of lower molecular weight than the corresponding polyethylene glycols and derivatives. Typically, $m$ is 4 to 12.

Suitable solvents of the above types which contain both ethylene glycol and propylene glycol moieties in their structures are also commercially available. Such solvents can be made by processes involving condensation of varying amounts of ethylene oxide with polypropylene glycols of various molecular weights, optionally with later conversion to esters or other chemical derivatives.

Other suitable solvents of the above types are reaction products of alkylene oxides with phenols, aryl amines, mercapto compounds, and sulfonic acids. Typical useful solvents of this type include products of the reaction of about ten moles of ethylene oxide per mole of phenol, aniline, thiophenol, naphthol, or sodium p-toluene sulfonate. Still other suitable solvents can be obtained by reaction of a polyglycol, such as a polyethylene glycol of about 600 average molecular weight, with one or two chemical equivalents of a compound such as ethyl chloroformate or methane sulfonyl chloride.

The other of the aforesaid classes of solvents disclosed by Blackwell et al. and which are useful herein includes a group of completely water-miscible compounds having the structure

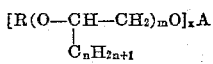

in which $x$ is the number of unsatisfied valences in A; A is selected from the group consisting of $ROCH_2CHORCH_2-$ $-CH_2CHORCH_2-,$

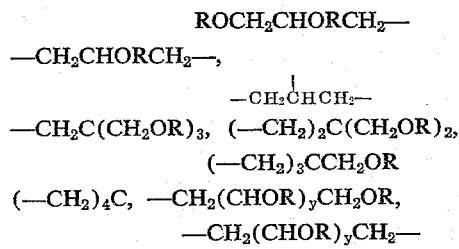

and $-CH_2(CHOR)_{y-z}(-CH)_zCH_2-$ in which $y$ is 2, 3 or 4 and $z$ is 0, 1, 2, 3, or 4 but no greater than $y$; and $n$, $m$ and R are as defined above.

Many examples of compounds of this class are articles of commerce currently used primarily as polyol components in the production of urethane rubbers and foams. Representative are reaction products of alkylene oxides with glycerol, trimethylol propane, pentaerythyritol, and soribtol, for example, those with average molecular weights of about 500. Such reaction products further modified by treatment with agents reactive toward their hydroxyl groups are also useful solvents in the subject dyeing process so long as they retain adequate water solubility. Exemplary solvents of this type can be obtained by reaction of sorbitol with ethylene oxide to obtain a product with an average molecular weight of about 600, followed by treatment with methyl chloroformate or acetic anhydride to react with up to about one half of the hydroxyl groups present.

The preferred solvents within this second class of solvents are polyols, and ether and ester derivatives thereof, wherein $n$ is zero and $m$ is no greater than 15.

Still another effect of this invention on the aforementioned Blackwell et al. dyeing process relates to the volatilization of the solvent. It has been found that the presence of boric acid decreases the volatility of solvents containing at least one free hydroxyl group so that discharge of solvent vapors to the air during the dyeing process is reduced or eliminated, thus improving the safety and commercial operability of the aforementioned dyeing process. It can be demonstrated in vitro that boric acid can form esters with the polyglycol solvents used in this dyeing process, including permethylated and peracetylated glycols, the stoichiometry of such esters being dependent on the structure of the polyglycol. These esters have greatly reduced volatility and are very good solvents for dissolving the dyes used in the aforementioned process. However, it is to be understood that the present invention does not require the formation of borate ester during the dyeing process itself.

In preparing dyebaths for use in the present invention, it is advantageous to use solvents which already contain boric acid and/or borax in such an amount that the optimum amount of solvent in the dye-bath automatically provides the boric acid and/or borax necessary to improve the strength and/or the balance of the resultant dyeing on cellulosic-synthetic blend fabrics.

The solvent preparation can consist simply of a solution of boric acid in a single or first solvent as previously defined. Water and/or a second solvent, also as previously defined, can be present. The introduction of a second solvent provides another means of adjusting the distribution of dyes between the blend components and may provide a more desirable distribution or a more economical means of reproducing the same distribution than with a single solvent. Preferably, the pH of the solvent preparation is adjusted, if necessary, until it is in the range 5–8 by adding an alkali metal hydroxide or a suitable quantity of borax. However, this is only possible if enough water is present to dissolve the alkali. The amount of boric acid in the preparation will depend on the solvent system, but it can vary from about 0.1–10% by weight of the solvent preparation. Preferably, about 2–6% boric acid is used. The first solvent can vary from about 5–99.9% by weight and the second solvent, from 0–25% by weight of the preparation. Preferably, the weight of solvent or mixed solvents is at least about 70% of the preparation. Water can be present from 0–94.9% by weight, but it preferably comprises about 20–30% of the preparation.

Preferred mixtures for use in formulating dyebaths for the dyeing of cellulosic-polyester blends by the method of Blackwell et al. contain methoxypolyethylene glycol 550 and advantageously a low molecular weight solvent such as butoxydiethylene glycol or methoxytriethylene glycol in the ratio of about 3:1. Specifically, the following mixtures have been found especially useful (all percentages being by weight):

(1)

| | Percent |
|---|---|
| Methoxypolyethylene glycol 550 | 75 |
| Boric acid | 4.8 |
| Water | to 100 | adjusted to pH 5–7 with concentrated sodium hydroxide solution;

(2)

| | Percent |
|---|---|
| The above preparation | 75 |
| Butoxydiethylene glycol or methoxytriethylene glycol | 18.75 |
| Water | to 100 |

A simple and favored embodiment of the present invention is one wherein the dye, water, solvent and boric acid and/or borax are applied to a blend fabric from a single pad-bath, after which the fabric is heated to 180°–225° C. However, the various materials can be applied to the fabric in any order. For example, the fabric can be pre-padded with a boric acid-solvent-water mixture, heated to remove water, overpadded with an aqueous dye dispersion and then heated to 180°–225° C.

The following is a typical procedure for the application of water-insoluble dyes to cellulosic blend fabrics by the method of Blackwell et al. as employed in the following examples:

Dyeing of 65/35 "Dacron" polyester/cotton blend fabric

A pad-bath is prepared from an aqueous dye paste (~15% active ingredient), purified vegetable gum thickener, dye solvent and water.

A sample of 65/35 "Dacron" polyester/cotton fabric is padded at 60% uptake, based on the weight of the fiber, and the padded fabric is dried at 80–100° C. for one minute and then heated in an oven at 200–210° C. for 100 seconds. The hot, dry fabric is cooled to room temperature and rinsed for one minute each in sequence: in water at 20–30° C., in water at 90°–95° C., in water containing 1% of an ether-alcohol sulfate detergent at 90–

95° C., in water at 90–95° C. and in water at 20–30° C. The material is dried and then scoured for 5 minutes in perchloroethylene at 50° C.

The following examples are given to illustrate the invention.

EXAMPLE 1

A red monoazo dye of the structure:

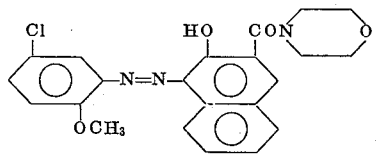

was applied in three separate experiments to 65/35 "Dacron" polyester/cotton blend fabric by a procedure essentially the same as that described above. The pad-baths contained:

| | |
|---|---|
| Red dye dispersion (15% active ingredient) | 75 grams. |
| Triethylene glycol diacetate | 200 grams. |
| Boric acid | 0, 10, 30 grams, respectively. |
| Water | To 1 liter. |

Visual inspection of the three dyed swatches indicated a progressive increase in shade strength with increasing boric acid concentration.

Removal of the cotton portion of the blend with 70% sulfuric acid (as described in the Technical Manual of the American Association of Textile Chemists and Colorists, 1969, p. 45) and inspection of the polyester component of the three samples revealed a progressive decrease in shade strength with increasing boric acid concentration. Since the shade strength of the blend increased with increasing boric acid, the decrease on the polyester was more than offset by an increase of shade strength on the cotton portion of the blend.

EXAMPLE 2

Three samples of cotton poplin fabric were dyed with the dyebaths and by the method described in Example 1 except that the perchloroethylene scour was repeated four times. Fixations were determined by comparison with dyed but unscoured material. The following results were obtained:

| Boric acid (g./l.): | Percent dye fixation |
|---|---|
| 0 | 12 |
| 10 | 38 |
| 30 | 48 |

Thus, fixation has been markedly improved through use of boric acid.

EXAMPLE 3

A violet anthraquinone dye of the structure:

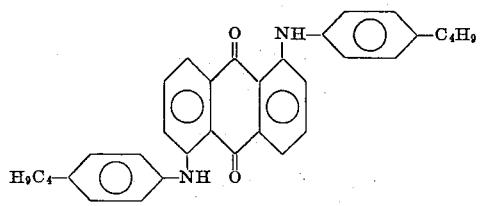

was applied to 65/35 "Dacron" polyester/cotton blend fabric in two experiments by the procedure described above, the pad-baths consisting of:

| | |
|---|---|
| Violet dye paste (~15% active ingredient) | 50 grams. |
| Purified vegetable gum thickener | 20 grams. |
| Dipropylene glycol | 100 grams. |
| Boric acid | 0, 20 grams, respectively. |
| Water | To 1 liter. |

Visual comparison of the two samples indicated that the boric acid increased the strength of the dyeing by about 15%. Removal of the cotton from the blend samples (as in Example 1) revealed that the polyester portion of the sample dyed in the presence of boric acid was about 25% weaker than the one dyed without boric acid.

EXAMPLE 4

Example 3 was repeated except that when 20 g./l. of boric acid was used, the amount of dipropylene glycol in the pad-bath was decreased from 100 to 80 grams. Visual examination of the two dyed swatches showed them to be essentially equal in shade depth, thus showing that less solvent is required when dyeing by the present invention.

EXAMPLE 5

A navy blue disazo dye of the structure:

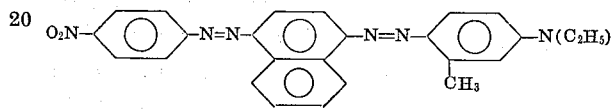

was applied to 65/35 "Dacron" polyester/cotton blend fabric in two experiments by the same procedure as that described above, the pad-bath containing

| | |
|---|---|
| Navy blue dye dispersion (~15% active ingredient) | 100 grams. |
| Purified vegetable gum thickener | 20 grams. |
| Solvent | 100 grams. |
| Boric acid | 0, 6.5 grams, respectively. |
| Water | To 1 liter. |

Four solvents were used and two dyeings were made with each solvent, that is, with and without boric acid. The solvents were:

(1) methoxypolyethylene glycol 350
(2) permethylated methoxypolyethylene glycol 350
(3) methoxypolyethylene glycol 550
(4) permethylated methoxypolyethylene glycol 550.

Visual comparison of the dyeings indicated that the presence of the boric acid led to the production of stronger dyeings on the blend. Weaker dyeings on the polyester component of the blend were observed when boric acid was present.

EXAMPLE 6

A black mix containing the navy blue dye of Example 5 and the monoazo yellow dye of the structure:

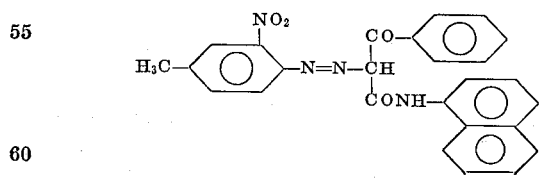

in the ratio of about 2:1 was applied to 65/35 "Dacron" polyester/cotton in two experiments by the same procedure as described above, the dyebaths containing

| | |
|---|---|
| Black dye mix (~15% active ingredient) | 140 grams. |
| Purified vegetable gum thickener | 20 grams. |
| Methoxypolyethylene glycol 550 | 100 grams. |
| Borax | 0, 20 grams, respectively. |
| Water | To 1 liter. |

Visual comparison of the two dyeings indicated that the presence of the borax produced an increase in shade strength on the blend fabric.

EXAMPLE 7

Each of three dyes was applied to 65/35 "Dacron" polyester/cotton blend fabric in five experiments by the procedure described above, the dyebaths containing

| | |
|---|---|
| Dye (15% active ingredient) | 50 grams. |
| Sodium alginate thickener (1% in water) | 150 ml. |
| Methoxypolyethylene glycol 550 | 75 grams. |
| Butoxydiethylene glycol | 25 grams. |
| Boric acid | 0, 3.2, 4.8, 9.6, 12.8 grams, respectively. |
| Water | To 1 liter. |

The pH was adjusted to at least about 5 to prevent precipitation of the thickener.

Each dyeing was divided into two portions and the cotton was removed from one portion as described in Example 1.

The shade strengths (represented by the Kubelka-Munk function F) of the blend fabric and the polyester component were then obtained by reflectance spectral measurements. The value of F is calculated from the equation $$F = \frac{(1-R)^2}{2R}$$

where R is the fraction of the light reflected from the dyed fabric at the wavelength of maximum absorption versus that reflected by a standard surface (e.g., barium sulfate).

From these values of F, the ratio $$\frac{F(\text{blend})}{F(\text{polyester})}$$

was calculated for each dyeing.

The dyes studied were:

(a) the violet anthraquinone dye of Example 3
(b) the navy blue disazo dye of Example 5
(c) a blue anthraquinone dye of the structure:

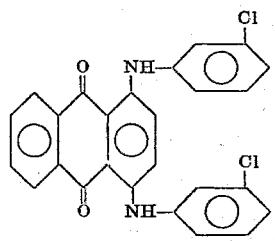

Each of the three dyes exhibited a significant increase in the value of $$\frac{F(\text{blend})}{F(\text{polyester})}$$

as the amount of boric acid in the dyebath increased, indicating a distribution of the dye in favor of the cotton. The tinctorial strength of the dyed blend fabric also increased in each case with increasing boric acid concentration.

EXAMPLE 8

A disazo orange dye of the structure:

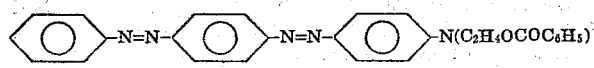

was applied to "Dacron" polyester-cotton blend fabric in six experiments by the procedure described above, the dyebaths containing

| | |
|---|---|
| Dye (15% active ingredient) | 50 grams. |
| Sodium alginate thickener (1% in water) | 150 ml. |
| Methoxypolyethylene glycol 550 | 68 grams. |
| Butoxydiethylene glycol | 23 grams. |
| Boric acid | 0, 2.9, 4.3, 5.8, 8.6, 11.5 grams, respectively. |
| Water | To 1 liter. |

As in Example 7, the pH was adjusted to at least about 5.

By the procedure given in Example 7, it was shown that the orange dye is progressively distributed in favor of the cotton as the concentration of boric acid increases. However, the tinctorial strength of the blend fabric decreased because at the given concentration of solvent with no boric acid present, this particular dye already was concentrated more heavily on the cotton than on the polyester ($F(\text{blend})/F(\text{polyester})=1.25$). As boric acid was added to the dyebath, the polyester became less and less heavily dyed and resulted in an overall strength decrease on the blend fabric. It can be concluded from this experiment that the orange dye can be applied efficiently to the blend fabric in the presence of boric acid with significantly less solvent than was used in the example.

The embodiments of the invention in which an exclusive property or privilege is claimed are defined as follows:

1. A liquid mixture used in the preparation of a padbath containing a preformed disperse dye, which padbath is used to dye water swellable cellulosic fibers or blends thereof with synthetic fibers, said liquid mixture consisting essentially of (a) 5-99.9% by weight of at least one solvent having the formula

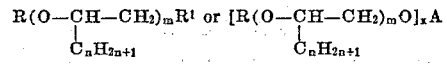

wherein
$n$ is 0 or 1;
$m$ is a positive whole number;
R is H, $C_{1-8}$ alkyl, $C_{7-15}$ aralkyl or alkaryl, $$R^2C-,\ R^2SO_2-,\ \text{or}\ R^2OC-$$
$$\underset{O}{\|}\qquad\qquad\underset{O}{\|}$$

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is —OH, —$OR^2$, —$SR^2$, —$NHR^2$, —$NR^2(C_{1-8}$ alkyl), —$NR^2(C_{7-15}$ aralkyl or alkaryl), $$-OCR^2,\ -OSO_2R^2,\ -OCOR^2$$
$$\underset{O}{\|}\qquad\qquad\qquad\underset{O}{\|}$$

—NH(phenyl), or —NH(naphthyl), wherein $R^2$ is as defined above;
$x$ is the number of unsatisfied valencies in A; and
A is $ROCH_2CHORCH_2-$, —$CH_2CHORCH_2-$,

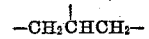

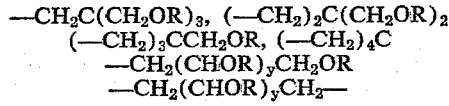

or

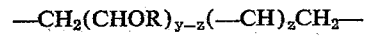

in which $y$ is 2, 3 or 4; $z$ is 0, 1, 2, 3 or 4 but no greater than $y$; and R is as defined above;
(b) 0.1–10% by weight of boric acid, borax or a mixture thereof, and
(c) the balance, if (a) and (b) total less than 100%, water.

2. The mixture of claim 1 in which component (b) is boric acid.

3. The mixture of claim 1 in which the boric acid constitutes 2-6% by weight of the mixture.

References Cited

UNITED STATES PATENTS

| 2,535,098 | 12/1950 | Shorey et al. | 8—82 |
| 2,323,593 | 2/1960 | Olpin et al. | 8—82 |
| 3,169,822 | 2/1965 | Randall et al. | 8—1.26 |
| 3,561,914 | 2/1971 | Abel et al. | 8—82 |

OTHER REFERENCES

Ellis, Printing Inks, Reinhold, 1950, pp. 114–116.

Lee et al., Chemical Abstracts, vol. 38 (1944), 4565–4566.

Kobayashi et al., Chemical Abstracts, vol. 45 (1951), 4089b.

GEORGE E. LESMES, Primary Examiner

J. P. BRAMMER, Assistant Examiner

U.S. Cl. X.R.

8—21 C, 82, 93, 173